Feb. 24, 1942. E. F. KLEIN 2,273,873
ADHESIVE SURGICAL DRESSING AND METHOD OF APPLYING THE SAME
Filed Nov. 28, 1938
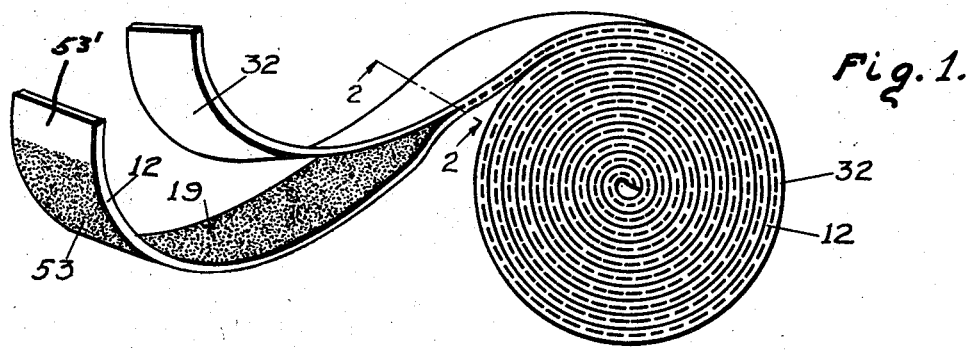
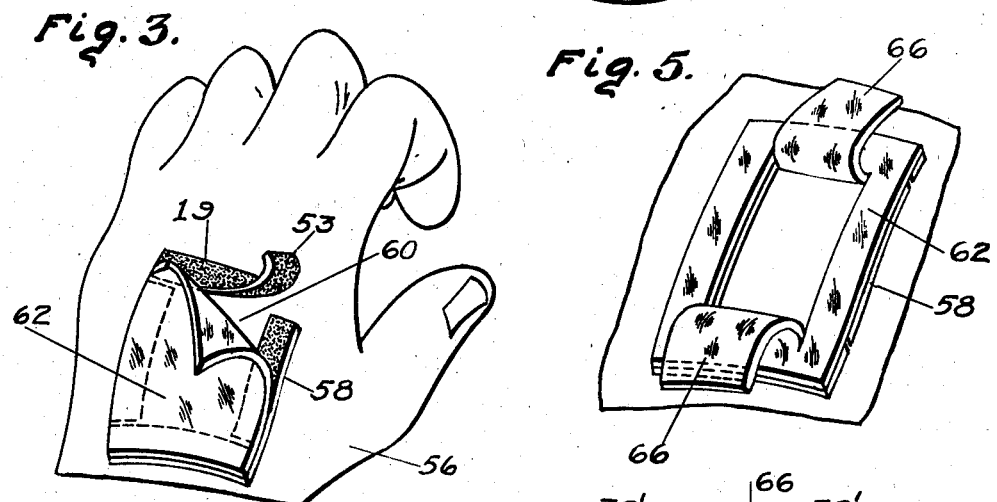
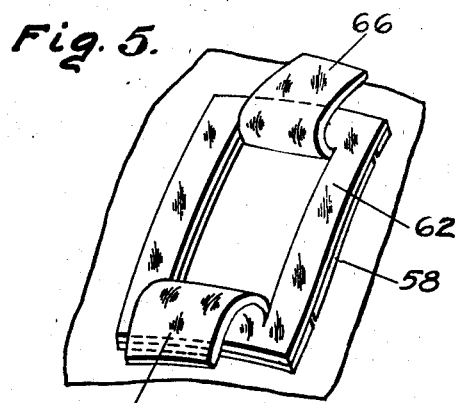
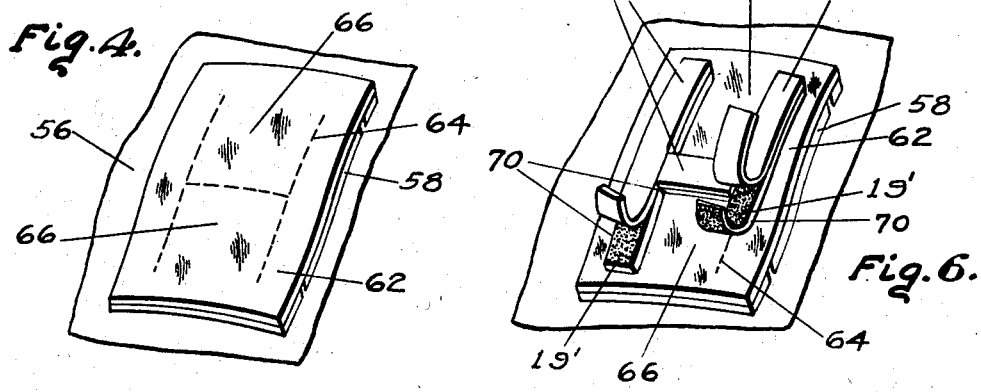
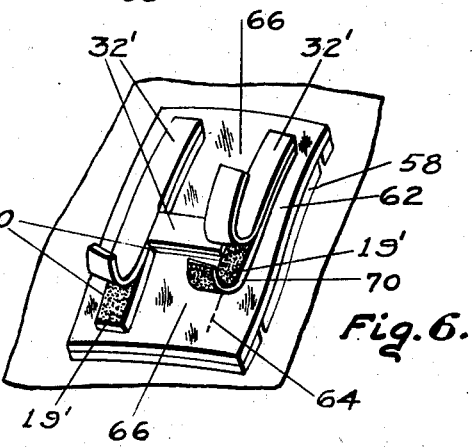
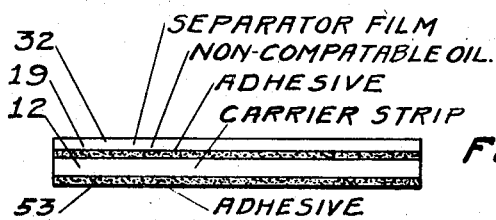
EDWARD F. KLEIN.
INVENTOR.
ATTORNEY.

Patented Feb. 24, 1942

2,273,873

UNITED STATES PATENT OFFICE 2,273,873

ADHESIVE SURGICAL DRESSING AND METHOD OF APPLYING THE SAME

Edward F. Klein, Perth Amboy, N. J., assignor to Raritan Bay Holding Company, Perth Amboy, N. J., a partnership composed of Edward F. Klein and Charles Yates Application November 28, 1938, Serial No. 242,817

3 Claims. (Cl. 128—156)

In accordance with the present invention, there is provided an improved transparent adhesive sheet of suitable composition of either vegetable, animal, or synthetic origin, having a transparent pressure-sensitive adhesive composition bonded integrally to both sides of the sheet, and which is adapted especially for use as a surgical dressing or a skin dressing, enabling to be observed readily the condition of a wounded or abraded area of tissue without requiring the removal of the dressing, as the area of tissue is visible continuously through the dressing.

In accordance with the present invention, a transparent, non-porous, freely-flexible base, such as a thin transparent sheet or film of cellulose acetate or other cellulosic derivative, or other suitable material, is coated on both sides with a transparent adhesive composition which is integrally bonded to the surfaces of the sheet, and which is adapted to be applied as a sterile surgical or skin dressing.

One object of the present invention is to provide a transparent, non-porous, freely-flexible sheet or strip with a pressure-sensitive adhesive which also is transparent and integrally bonded to the transparent flexible sheet, so that the adhesive is commingled with the material of the sheet, and which may be applied as a surgical or skin dressing in the treatment of wounds.

A further object of the present invention comprises the provision of a surgical or skin dressing of the above-indicated character which enables the condition of the wound to be observed without requiring the removal of the dressing from the location of its application, and which further enables access to be had to the site of the wound without necessitating removal of the dressing.

A still further object of the invention is to provide an adhesive dressing of the above indicated character which, although coated on both sides with a tacky, pressure-sensitive adhesive, may be supplied in rolls without contact of the adhesive with the turns or convolutions of the material in the roll, thereby allowing free and unimpeded unrolling of the material.

A still further object of the invention is to provide an improved method of applying surgical or skin dressings in the treatment of wounds or other abrasions of flesh or skin.

Further objects of the invention will become apparent as the description proceeds, and the features of novelty will be pointed out in particularity in the appended claims; and the invention accordingly comprises the features of construction, combination of elements, and arrangement of parts, which will be exemplified in the construction hereinafter set forth, and the scope of the application of which will be indicated in the claims.

The objects of the invention are attained importantly by the application of a normally tacky, pressure-sensitive adhesive, preferably a rubber-free adhesive which is pressure-sensitive at ordinary temperatures to a freely-flexible transparent, non-porous film-like base, such as a strip of cellulose acetate, Cellophane, or a transparent synthetic plastic, a transparent rubber derivative, or the like, the adhesive being applied on both sides of the transparent base in such a manner as to bond the adhesive integrally to the base.

This is done either by applying the adhesive composition to the base while the latter is still tacky, as the tape or sheet is formed from its solution, or by incorporating a suitable solvent for the base material with the adhesive composition, whereupon, when the base hardens or the solvent evaporates, the adhesive material will have entered into the surface of the base and will have become bonded integrally therewith.

The adhesive surface then is covered with a suitable readily removable strip or separator sheet which protects its side of the adhesive strip and which preferably is treated with an oil or like material which is incompatible with the adhesive coating so as not to merge therewith and assures the ready removal of the strip sheet from the adhesive coating so as to expose the tacky adhesive when the strip is to be used.

Subsequently to the application of the separator strip, the opposite side of the flexible base is coated with adhesive, which is bonded integrally to the base, the latter being given a suitable twist to apply this second coating of adhesive, and conveyed through drying instrumentalities without contact of the exposed adhesive coating with supporting and conveying means of the apparatus. When the coatings have been applied, the strip is rolled so that the separator strip is on the outside of the roll and between the exposed adhesive coating in the convolutions of the roll, thereby separating the same and enabling unimpeded unrolling of the strip.

The invention will be understood more readily by reference to the accompanying drawing in which Fig. 1 is a perspective view of a roll of the completed strip, the view illustrating the manner in which the strip is rolled to afford substantially non-adhesive protection to both sides of the completed strip.

Fig. 2 is a sectional elevation taken on the line 2—2 of Fig. 1, looking in the direction of the arrows.

Fig. 3 is a perspective view showing the manner of application of the strips as a dressing.

Fig. 4 is a fragmentary perspective view of the applied dressing, the view indicating a manner of enabling access to be had to the surface beneath the dressing without removing the dressing.

Fig. 5 is a view similar to Fig. 4, but showing the dressing opened for access to the surface beneath the dressing.

Fig. 6 is a view similar to Figs. 4 and 5, showing a way of closing the dressing after opening the same, without removing the dressing from its location.

Referring more particularly to the drawing, reference numeral 12 indicates a freely-flexible, transparent, non-porous strip or tape having a layer or coating 19 of a suitable transparent, pressure-sensitive adhesive composition applied to one side thereof. This adhesive composition is incorporated in a solvent which is compatible both with the adhesive and with the material composing the tape, acting on the tape to render its surface soft and tacky so that the pressure-sensitive adhesive becomes commingled or "fused" with the tape. The adhesive composition is such that it remains tacky and pressure-sensitive at ordinary temperatures after evaporation of the solvent.

The tape 12, after being coated on one side with adhesive is passed through a drying apparatus.

The solvent from the adhesive composition is evaporated by hot air in the drying chamber, and leaves the pressure-sensitive adhesive in tacky condition integrally bonded with the base 12.

The strip 12 has applied to it a thin separator strip 32 having applied thereto an oil or other coating material which is incompatible with the tacky adhesive on the tape 12. Such incompatible material may be linseed oil, cotton-seed oil, petrolatum, or the like.

The oil coated separator strip has an oil coating applied to its other side and then is pressed into superficial contact with the adhesively coated side of the strip 12.

The uncoated surface of strip 12 then has applied thereto a coating 53 of adhesive. This adhesive is entirely similar to adhesive 20, and becomes commingled and fused with strip 12, thereby becoming integrally bonded thereto, in the same manner as is the case with adhesive 20.

The strip is finally wound on a roll as shown in Fig. 1 with the separator strip 32 on the outside of the resulting coil and interposed between the convolutions of the coil so that it covers in the coil the adhesive layer 53 as well as the adhesive layer 19, so that the convolutions of the strip in the roll will not stick together, but will be always freely separable.

During the drying the solvents are expelled, leaving the adhesive as a pressure-sensitive, tacky coating on both sides of the tape, which is adapted to adhere to the desired surface at ordinary temperatures by means of light pressure only, no heat being required to be applied, the adhesive coatings being fused and commingled into the tape itself to form an integral union therewith. The adhesive may be applied either as a solution or as a paste, and it may be applied either to a preformed strip or tape of cellulose ester, Cellophane or the like, or it may be applied as the strip or tape is being formed from its solution and which is in what may be regarded as being in a "nascent" condition. The desired degree of adhesion of the prepared tape to the surface to which it is applied may be adjusted by corresponding variations in the amounts of plasticizers incorporated in the adhesive composition so as to adjust the amount of tackiness in the adhesive coatings.

In Fig. 3, there is shown the application of the present adhesive as a skin or surgical dressing. To an affected part 56, strips 58, of the improved transparent doubly-coated adhesive material, are applied so as to enclose the injured area 60, the exposed adhesive surface 53 of the strips, of course, being applied to the skin or tissue of the affected part, gentle pressure being exerted to effect adhesion of the strips to the part.

When the strips are applied so as to enclose the affected area, the separator strips 32 are removed, thereby exposing the other tacky adhesively-coated surface 19 of the strips. A transparent covering sheet 62 is then placed upon these tacky surfaces and united thereto by gentle pressure. This sheet 62 preferably is a freely-flexible sheet of cellulosic ester film, or a sheet of Cellophane, and its transparency enables unimpeded inspection of the injured area without requiring any disturbance of the dressing; although, of course, if the nature of the injury renders it to be desirable to do so, a gauze may be used either in conjunction with the transparent sheet 62, or instead of this sheet; in the latter event, the gauze is applied directly to the tacky surfaces 19. However, this latter is not desirable, it being far preferable, when gauze is applied to the part, to keep it out of contact with the surfaces 19, and to use the flexible sheet 62 as a retaining means to hold the gauze in place, the sheet 62 being provided sufficiently large to overlie such gauze while being in contact with all of the adhesive surfaces 19. If gauze were applied directly to such surfaces, obviously it could not be removed or replaced without difficulty and without impairment to the adhesiveness of the surfaces 19 owing to the adherence of lint thereto.

If for any purpose it be desired to have access to the underside of the sheet 62, such access may be had simply by cutting the sheet as indicated at 64, without disturbing its position, or without loosening the strips 58, and laying back the cut portions as indicated at 66 in Fig. 5, thereby exposing the injured area for treatment, after which the portions 66 are simply replaced in position as indicated in Fig. 6, and the cuts therein bridged over by additional strips 70 of the improved adhesive, with the separator layer 32' applied or retained thereon to cover the tacky surface 19' which otherwise would be objectionably exposed. The view shows the bridging strips partially separated for clarity of illustration.

It will be seen, therefore, that the present invention provides an improved skin or surgical dressing which enables the ready inspection of the condition of an injured area without disturbing any elements of the dressing, or which enables access to the area to be treated without requiring the removal of adhesive elements, thereby obviating attendant discomfort to the patient, or any possible aggravation of the injury because of such removal.

It will be understood, of course, that the terms "tape," "strip" or "sheet" are used interchangeably herein, and without any limitations as to the ratio between width and length, and the term "transparent" includes any such light transmission as will render the covered surface visible through the coverings.

It will be understood, of course, that the invention is not limited, necessarily, to the specific details of the process and structure of the finished article and the manner of its application, but it will be apparent that such details are subject to various modifications which will become apparent readily to one skilled in the art, without departing from the spirit of the invention; and it will be understood, therefore, that it is intended and desired to include within the scope of the invention such modifications and changes as may be necessary to adapt it to varying conditions and uses; and it also is to be understood that the following claims are intended to cover all of the generic and specific features of the invention herein described, and all statements of the scope of the invention which, as a matter of language, may be said to fall therebetween.

What is claimed is:

1. A transparent surgical wound dressing covering comprising a freely flexible, transparent, non-porous tape provided on both faces thereof with transparent, pressure-sensitive adhesive coatings, said tape being adapted to have one coating thereof applied to a wound area for defining the outline and margins of said area and provide for vision of the surface covered by the tape, a separator sheet having a coating incompatible with and superficially secured to the exposed adhesive coating of said tape for protection thereof pending completion of the dressing covering, and a transparent cover sheet adapted to be secured to the adhesive coating on removal of the separator sheet, said transparent cover sheet being of such dimensions as to bridge the wound area defined by the tape in spaced relation thereto equal to the thickness of the tape, and enabling clear vision to be had of the wound area while providing a sanitary covering for said wound area.

2. A transparent surgical wound dressing covering comprising a freely flexible, transparent, non-porous tape provided on both faces thereof with transparent, adhesive coatings, said tape being adapted to be applied to a wound area for defining the outline of said area and provide for vision of the surface covered by the tape, a separator sheet superficially secured to the exposed adhesive coating of said tape for protection thereof pending completion of the dressing covering, and a transparent cover sheet adapted to be secured to the adhesive coating on removal of the separator sheet, said transparent cover sheet being of such dimensions as to bridge the wound area defined by the tape in spaced relation thereto equal to the thickness of the tape, and enabling clear vision to be had of the wound area while providing a sanitary covering for said wound area.

3. The method of applying a surgical dressing comprising strips having on one side thereof a coating of a tacky adhesive and a separator sheet lightly adhering thereto, and an exposed tacky adhesive coating on the other side thereof, to a surface of tissue including an open wound, which method consists in applying the strips to the said surface, with the exposed adhesive coating applied under sufficient pressure to secure adhesion thereto so that a portion of said surface which includes the wound is defined and enclosed by the strips, removing the separator sheet from each strip to expose the adhesive surface thereunder, and applying a covering sheet to said last mentioned exposed surface of said strip over said area so that the covering bridges the strips and said area in spaced relation thereto equal to the thickness of the strip.

EDWARD F. KLEIN.